June 15, 1937.  G. G. JERNER ET AL  2,083,786
GARDEN TOOL
Filed Feb. 27, 1936
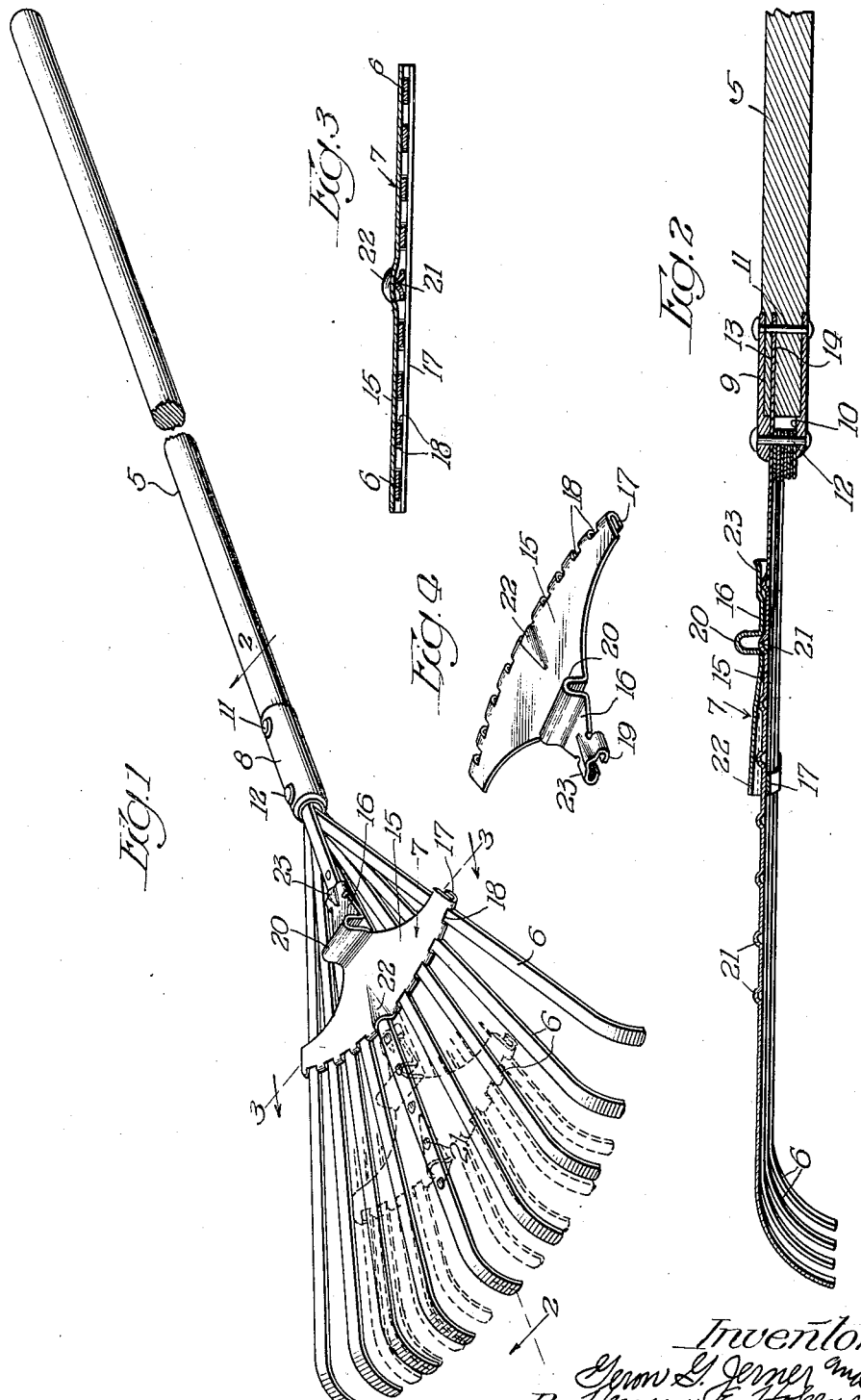
Inventors
Geo. G. Jerner and
By Herman E. Hokenson
Fred Gerlach Atty.

Patented June 15, 1937

2,083,786

UNITED STATES PATENT OFFICE 2,083,786

GARDEN TOOL

Geron G. Jerner and Herman E. Hokenson, Lake Forest, Ill.

Application February 27, 1936, Serial No. 66,046

7 Claims. (Cl. 55—114)

The present invention relates generally to garden tools. More particularly the invention relates to that type of tool which is designed for use in breaking up or cultivating soil or for raking or clearing leaves, grass and other debris from lawns and gardens and consists (1) of an elongated handle; (2) a plurality of teeth which are connected to and radiate from one end of the handle and have downwardly curved or bent outer ends for soil cultivating or raking purposes; and (3) a member which is connected to, and slidable lengthwise of, the teeth and operates when slid away from the handle to move the teeth towards one another in closely spaced relation and when shifted towards the handle to spread the teeth farther apart.

One object of the invention is to provide a garden tool of this type in which the slidable teeth controlling member is formed of a single piece of sheet metal and is of novel design and construction.

Another object of the invention is to provide a garden tool of the type and character under consideration in which the sheet metal, slidably mounted, teeth controlling member has the central portion thereof bent upwards and then downwards to form a handle which is in the form of a loop and permits the member to be readily gripped or held by the fingers when it is slid to and from the handle for teeth adjusting purposes.

A further object of the invention is to provide a garden tool of the last mentioned type and character in which the center tooth is provided with a longitudinal series of up-struck, knob-like protuberances which are adapted to spring into and seat within the handle forming portion of the member and serve releasably to lock the member in the various positions into which it is shifted.

A still further object of the invention is to provide a garden tool of the adjustable teeth type which is simple to manufacture and assemble and may be constructed at a low and reasonable cost and shaped in a compact manner.

Other objects of the invention and the various advantages and characteristics of the present garden tool will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective of a garden tool embodying the invention;

Figure 2 is a longitudinal section taken on the line 2—2 of Figure 1 and showing in detail the manner in which the teeth are connected to the handle;

Figure 3 is a transverse section taken on the line 3—3 of Figure 1 and illustrating the manner in which the controlling member is connected slidably to the teeth; and Figure 4 is a perspective of the teeth controlling member of the tool.

The garden tool which forms the subject matter of the invention is adapted for use in breaking up or cultivating soil or in raking or clearing leaves, grass and other debris from lawns and gardens. As shown in Figure 1 of the drawing the tool is of the hand-operated variety or type and comprises an elongated handle 5, a plurality of cultivating or raking teeth 6, and a member 7 for controlling the teeth.

The handle 5 is formed of wood or like material and is circular in cross-section. One end of the handle is adapted to be gripped by the hand or hands. The other end of the handle embodies a sleeve-like part 8. The latter is formed of metal and has a large bore 9 in one end thereof and a coaxial smaller bore 10 in its other end. The bore 9 forms an annular or cylindrical socket in which fits the contiguous end of the handle 5. A stud or rivet 11 extends transversely through the sleeve part 8 and the contiguous end of the handle 5 and serves to hold the sleeve part in connected or fixed relation with respect to the handle.

The teeth 6 radiate from the sleeve-like part 8 on the handle 5 and are spaced equidistantly apart. They are formed of flat strips of metal and have the outer ends thereof bent or curved downwardly for soil cultivating or raking purposes. The inner ends of the teeth are arranged in lapped relation as shown in Figure 2 of the drawing. They extend into the bore 10 of the sleeve-like part 8 and are pivotally connected to a pin 12. The latter is carried by and extends transversely through the outer end of the sleeve like part 8. The teeth 6 because they are connected at their inner ends to the pin 12 are adapted to swing to and from one another. The inner end of the center tooth is provided with an extension 13. The latter extends through the bore 9 in the sleeve-like part 8. It fits within a socket 14 in the contiguous end of the handle 5 and is anchored to the stud or rivet 11. Because the extension is anchored to the stud the center tooth is held in fixed relation with respect to the handle 5 and operates in conjunction with the teeth controlling member 7 to prevent the other teeth from swinging in a unitary manner sidewise of the handle. By reason of the fact that the inner ends of the teeth are arranged in lapped relation and fit within the sleeve part 8, there is no likelihood of the inner ends of the teeth catching onto and snagging bushes or shrubbery when the tool is used for raking purposes.

The teeth controlling member 7 is in the form of a one-piece sheet metal stamping and comprises a substantially flat fan-shaped part 15 and a narrow centrally disposed part 16. The fan-shaped part 15 overlies and extends transversely of the teeth 6. The outer margin of the fan-shaped part 15, that is the margin that is farthest from the sleeve-like part 8 is bent downwardly and then inwardly to form an inturned flange 17. This flange is spaced from the fan-shaped part 15 of the teeth controlling member 7 as shown in Figure 3 and the bent portion of the part, that is the portion which connects the flange to the part, has longitudinally extending slots 18 through which the teeth 6 extend. The slots 18 are equidistantly spaced. When the controlling member 7 is shafted towards the sleeve-like part 8 on the handle 5, the teeth 6 are swung apart into a position wherein they are widely spaced apart. When the member 7 is slid or shifted away from the handle the teeth are swung towards one another into closely spaced relation. By sliding the member 7 towards or away from the part 8 the teeth may be swung to and from one another as desired. The pin 12 constitutes the articulation point for the teeth. The narrow part 16 of the teeth controlling member 7 is formed integrally with the part 15 and extends inwardly from the latter, that is, towards or in the direction of, the sleeve-like part 8 on the handle 5. It overlies the center tooth and is provided at its inner end with a pair of downwardly and inwardly extending ears 19. These ears extend around and grip the side edges of the center or middle tooth and form a sliding connection between the narrow part 16 of the teeth controlling member 7 and said center or middle tooth. The central portion of the narrow part 16 is bent upwards and then downwards to form a handle 20. The latter is in the form of a loop and permits the member 7 to be readily gripped or held by the fingers when it is slid to and from the handle for teeth adjusting purposes.

In order releasably to hold the teeth controlling member 7 in its various positions the central or middle tooth is provided with a longitudinal series of knob-like protuberances 21. These protuberances as shown in Figures 2 and 3, are upstruck as far as the center tooth is concerned and are adapted successively to seat or spring within the loop formed handle 20 when the teeth controlling member 7 is shifted or slid inwards or outwards relatively to the teeth 6. When any one of the protuberances 21 is seated within the loop formed handle 20 the teeth controlling part 7 is locked against accidental displacement to and from the handle 5 and serves to hold the teeth 5 in a fixed position as far as their spacing is concerned. The central portion of the teeth controlling part 7 is sufficiently resilient so that the loop-formed handle 20 of the narrow piece 16 may be readily disengaged from or shifted out of locked relation with respect to any one of the protuberances 21 seated therein. In order to prevent the outer margin of the fan-shaped part 15 of the teeth controlling member 7 from catching on the protuberances 21 when the member is shifted outwards to swing the teeth together the central portion of the part 15 is struck upwardly to form a tapered guide-way 22. This guide-way is preferably of slightly greater height than the protuberances. An upstruck tapered guide-way 23 is formed on the narrow part 16 and prevents said part 16 from catching on the protuberances 21 when the member 15 is shifted towards the handle 5 in order to spread apart the teeth 6. This guide-way 23 is centrally located with respect to the narrow part 16 and is disposed between the ears 19.

In fabricating the tool the teeth 6 prior to attachment to the pin 12 are threaded or inserted through the slots 18 in the teeth controlling member 7. Thereafter the inner ends of the teeth are positioned in proper lapped relation and are then inserted into the bore 10 of the sleeve-like part 8 and connected to the pivot pin 12.

When it is desired to separate the teeth 6 so as to adapt the tool for raking purposes the loop-formed handle 20 of the teeth controlling member 7 is gripped by the fingers and the member is slid towards the handle 5. During slide of the member towards the handle the teeth 6 are caused positively to swing outwards. When it is desired to use the tool for soil cultivating purposes or to rake leaves or grass between bushes or from other restricted areas the loop-formed handle 20 is gripped by the fingers and the teeth controlling part 7 is shifted away from the handle 5. This type of shift of the member 7 causes the teeth 6 to move towards one another. The teeth controlling member 7 after shift thereof into place, is releasably locked in its assigned position as the result of the action of the protuberances 21 and the handle 20.

The herein described tool consists of but a small number of parts and may be manufactured at a low and reasonable cost. In addition it may be shipped in a compact manner. By reason of the fact that the teeth controlling member is not attached to the handle 5, the teeth are flexible throughout their entire length and are not likely to break.

The invention is not to be understood as restricted to the details set forth since these may be modified within the scope of the appended claims, without departing from the spirit and scope of the invention.

Having thus described the invention, what we claim as new and desire to secure by Letters Patent is:

1. As a new article of manufacture, a garden tool comprising in combination a handle, a plurality of laterally spaced teeth connected to and radiating from one end of the handle and having the outer ends thereof extending downwardly for cultivating or raking purposes, and means for moving the teeth to and from one another consisting of a member slidable longitudinally of the teeth and comprising a fan-shaped part extending transversely across the teeth and provided with substantially equidistantly spaced slots corresponding in number to the teeth and through which the teeth extend respectively and also comprising a narrow part connected to the central portion of the fan shaped part and having a pair of oppositely facing, inwardly extending ears extending around and forming a sliding connection with one of the inner teeth.

2. As a new article of manufacture, a garden tool comprising in combination an elongated handle, a plurality of laterally spaced teeth connected to and radiating from one end of the handle and having the outer ends thereof extending downwardly for cultivating or raking purposes, and means for moving the teeth to and from one another consisting of a sheet metal member slidable longitudinally of the teeth and comprising a fan-shaped part extending transversely across the top faces of the teeth and having the outer margin thereof bent downwardly and inwardly to form an inturned flange beneath the teeth and having in the bent portion thereof between it and the flange substantially equidistantly spaced slots corresponding in number to the teeth and through which the teeth extend respectively, and also comprising a narrow part formed integrally with, and extending toward the handle from, the central portion of the inner margin of the fan-shaped part and having a pair of oppositely facing, inwardly extending ears extending around and forming a sliding connection with one of the inner teeth.

3. As a new article of manufacture, a garden tool comprising in combination a handle, a plurality of laterally spaced teeth connected to and radiating from one end of the handle and having the outer ends thereof extending downwardly for cultivating or raking purposes, and means for moving the teeth to and from one another consisting of a sheet metal member slidable longitudinally of the teeth and comprising a laterally elongated main part extending transversely across the top faces of the teeth and having along one of the long margins thereof a longitudinal series of substantially equidistantly spaced slots corresponding in number to the teeth and through which the teeth extend respectively, and also comprising a narrow part formed integrally with and projecting away from the central portion of the other long margin of said laterally elongated main part and having a portion thereof bent upwardly and downwardly to form a handle forming loop whereby the member may be gripped by the fingers when it is slid longitudinally of the teeth.

4. As a new article of manufacture, a garden tool comprising in combination an elongated handle, a plurality of laterally spaced teeth connected to and radiating from one end of the handle and having the outer ends thereof extending downwardly for cultivating or raking purposes, and means for moving the teeth to and from one another consisting of a sheet metal member slidable longitudinally of the teeth and comprising a fan-shaped part extending transversely across the top faces of the teeth and having adjacent to the outer margin thereof a longitudinal series of substantially equidistantly spaced slots corresponding in number to the teeth and through which the teeth extend respectively, and also comprising a narrow part formed integrally with, and extending toward the handle from, the central portion of the fan-shaped part and having a portion thereof bent upwards and then downwards to form a handle forming loop whereby the member may be gripped by the fingers when it is slid longitudinally of the teeth.

5. As a new article of manufacture, a garden tool comprising in combination a handle, a plurality of laterally spaced teeth connected to and radiating from one end of the handle and having the outer ends thereof extending downwardly for cultivating or raking purposes, and means for moving the teeth to and from one another consisting of a sheet metal member slidable longitudinally of the teeth and comprising a laterally elongated main part extending transversely across the top faces of the teeth and having adjacent to one of the long margins thereof a longitudinal series of substantially equidistantly spaced slots corresponding in number to the teeth and through which the teeth extend respectively, and also comprising a narrow part formed integrally with, and projecting away, the central portion of the other long margin of the said laterally elongated main part and having means forming a sliding connection with one of the inner teeth and also having a portion thereof bent upwards and then downwards to form a handle forming loop whereby the member may be gripped by the fingers when it is slid longitudinally of the teeth.

6. As a new article of manufacture, a garden tool comprising in combination an elongated handle, a plurality of laterally spaced teeth connected to and radiating from one end of the handle and having the outer ends thereof extending downwardly for cultivating or raking purposes, and means for moving the teeth to and from one another consisting of a sheet metal member slidable longitudinally of the teeth and comprising a fan-shaped part extending transversely across the top faces of the teeth and having the outer margin thereof bent downwardly and then inwardly to form an inturned flange beneath the teeth and having in the bent portion thereof between it and the flange substantially equidistantly spaced slots corresponding in number to the teeth and through which the teeth extend respectively, and also comprising a narrow part formed integrally with, and extending toward the handle from, the central portion of the inner margin of the fan-shaped part and having the outer end thereof shaped to form a pair of oppositely facing, inwardly extending ears for gripping and engaging slidably one of the inner teeth and having the portion thereof adjacent said fan-shaped part bent upwardly and then downwardly to form a handle forming loop whereby the member may be gripped by the fingers when it is slid longitudinally of the teeth.

7. As a new article of manufacture, a standard tool comprising in combination an elongated handle, a plurality of laterally spaced teeth connected to and radiating from one end of the handle having the outer ends thereof extending downwardly for raking or cultivating purposes, a sheet metal member for moving the teeth to and from one another, connected to and slidable lengthwise of the teeth and having a part thereof bent upwards and then downwards to form a handle forming loop whereby the member may be gripped by the fingers when it is slid lengthwise of the teeth, and means for releasably holding the member in the various positions into which it is slid consisting of a longitudinal series of protuberances formed on one of the teeth and adapted to fit within and coact with said loop.

GERON G. JERNER.
HERMAN E. HOKENSON.